Feb. 14, 1939.  H. L. COLLINS  2,146,712
SHEARING HEAD CONSTRUCTION
Filed May 18, 1938
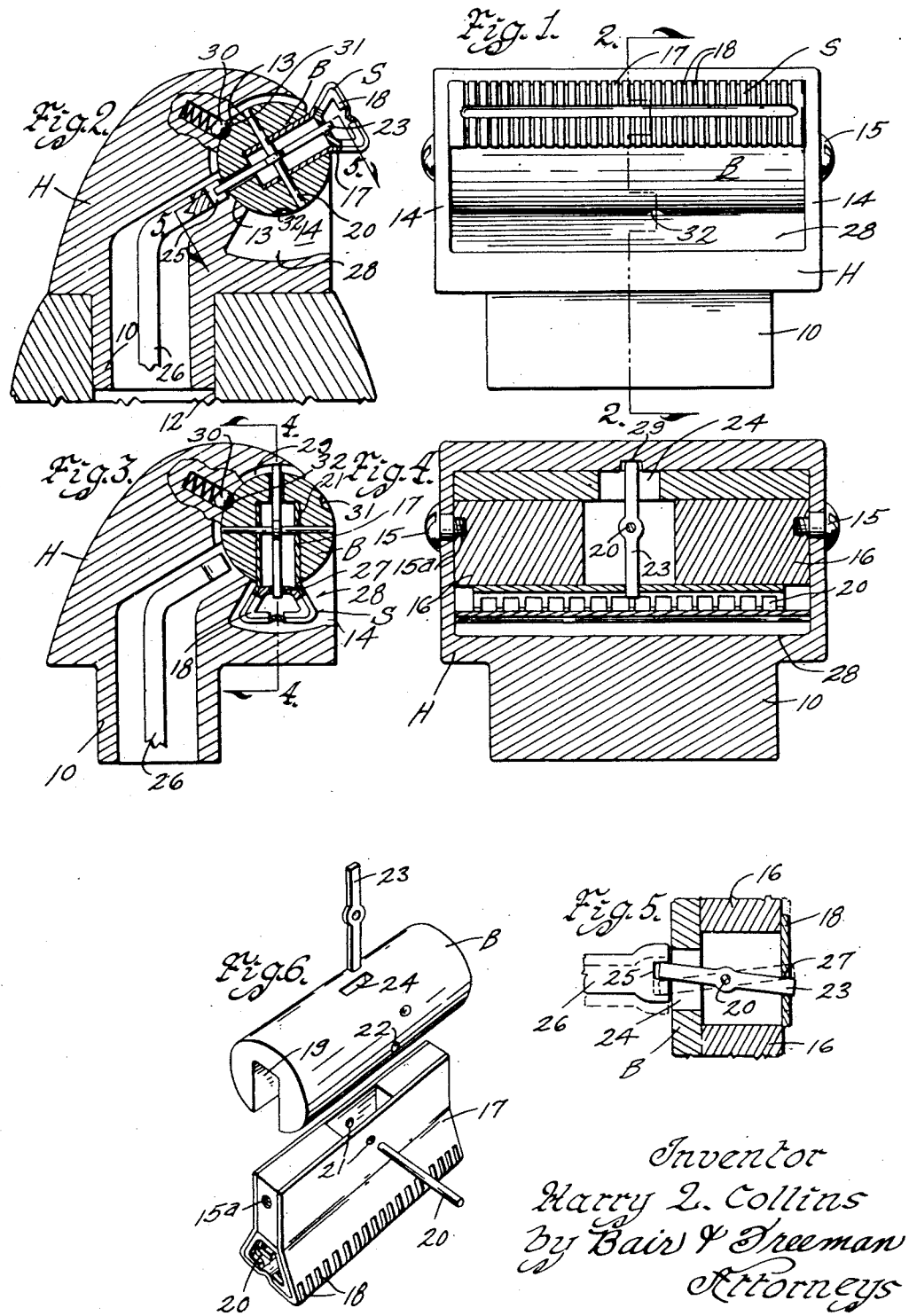
Inventor
Harry L. Collins
by Bair & Freeman
Attorneys Patented Feb. 14, 1939

2,146,712

UNITED STATES PATENT OFFICE 2,146,712

SHEARING HEAD CONSTRUCTION

Harry L. Collins, St. Louis, Mo., assignor to Knapp-Monarch Company, St. Louis, Mo., a corporation of Missouri Application May 18, 1938, Serial No. 208,645

14 Claims. (Cl. 30—43)

An object of my present invention is to provide a shearing head construction which can be simply and inexpensively manufactured and which has a protection feature for the shearing head portion of the device.

Another object is to provide a shearing head construction in which the shearing head proper is so mounted in a head member that it can either extend therefrom for normal operation or be swung to a protected position in a socket of the head member when not in use or when shipping the device.

Still another object is to provide a shearing head construction comprising a head member having rotatably mounted therein a body member which carries the shearing head, a socket in the head member being adapted to receive the shearing head when not in use by rotation of the body member to one position, the body member when rotated to another position being so related to the head member that the shearing head projects from the head member for use.

Still another object is to provide motion-transmitting means for the inner cutter of the shearing head, which means extends through the body member and coacts with an operating lever when the body member is rotated to position for use of the shearing head.

With these and other objects in view, my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a front elevation of a shearing head construction embodying my invention and showing the shearing head in position for use.

Figure 2 is a sectional view on the line 2—2 of Figure 1.

Figure 3 is a similar sectional view showing the shearing head rotated to a protected position.

Figure 4 is a sectional view on the line 4—4 of Figure 3.

Figure 5 is a sectional view on the line 5—5 of Figure 2 showing the operation of a motion transmitting means; and Figure 6 is an exploded perspective view of the shearing head, body member and motion-transmitting means.

On the accompanying drawing I have used the reference character M to indicate part of a motor casing of the usual type now provided for operating "dry shavers". My shearing head construction includes a head member H, a shearing head S and a body member B. The head member H has a shank 10 received in a socket 12 of the motor M and retained therein in any suitable manner.

The head member H is provided with a cylindrical bore 13 extending throughout about a half circle as illustrated in Figures 2 and 3. The cylindrical bore 13 is closed by end members 14. The body member B is cylindrical in shape to seat in the cylindrical bore 13 and is retained seated therein by shouldered screws 15 threaded into the ends of blocks 16 mounted in the body member. The axes of the screws 15 are on the axis of rotation of the body member B.

The shearing head S comprises an outer cutter member 17 and an inner cutter member 18. These members are formed preferably of sheet metal with notches 19 and 20 respectively whereby to provide teeth for shearing coaction with each other by reciprocation of the inner cutter relative to the outer one. The blocks 16 are interposed between the sides of the outer cutter 17 as shown in Figure 6, whereby the blocks and the outer cutter form a unitary structure. Such structure is retained in a slot 19 of the body member B by a pin 20 extending through openings 21 and 22 of the outer cutter and body member respectively. For retaining the inner cutter 18 in shearing contact with the outer cutter, spring means is usually provided but has been omitted from my drawing because it forms no part of my present invention.

Pivoted on the pin 20 is a motion-transmitting lever 23, which extends through a space between the blocks 16 as shown in Figure 4 and through a slot 24 in the body member B to a position projecting from the side of the body member opposite the shearing head S as shown in Figure 2. Its projecting end is received in a notch 25 of an operating lever 26 which is reciprocated in the usual manner from an electric motor (not shown). The manner of reciprocation is shown in Figure 5 wherein one end of the lever 23 is shown received in a slot 27 of the inner cutter 18 and the other end in the notch 25. One position of movement is shown by solid lines and another by dotted lines whereby it is obvious that reciprocations of the operating lever 26 will impart reciprocations to the inner cutter in a reverse direction through the pivoted lever 23.

After the shearing head S has been used or during shipment thereof, it is desirable to protect it against injury particularly when it is made of relatively light sheet metal. I accordingly provide a socket 28 in the head member H adjacent the shearing head when in the position shown in Figure 2 into which the shearing head can be rotated as shown in Figure 3. The projecting end of the lever 23 disengages the notches 25 of the operating lever 26 and travels through an arcuate groove 29 provided for clearance of the lever when swung to the position of Figure 3. In returning to operating position, the lever 23 will enter the notch 25 when the two are in registry with each other and such registry can be effected by manually oscillating the lever 26 while rotating the body member B from the position of Figure 3 to the position of Figure 2, the upper end of the lever 26 being widened to prevent any possibility of the lever 27 assuming a position on either side thereof where the parts would be inoperative.

It is desirable to normally retain the body member B with the shearing member S in the operating position as in Figure 2 or in the protected position as in Figure 3. This can readily be accomplished by the use of a spring-pressed ball 30 adapted to coact with depressions 31 or 32 respectively in the two different positions of the body member. The ball 30 is slightly offset from the groove 29 so as not to interfere with the lever 23 during rotation of the body member from one position to another.

My structure makes it readily possible to provide a dry shaver having a stamped sheet metal head and to provide for ample protection thereof when not in use by a rugged head member entirely enclosing the shearing head. At the same time the shearing head can be readily adjusted to either a position for use or a protected position in a minimum of time and with a minimum of operation.

Some changes may be made in the construction and arrangement of the parts of my shearing head construction without departing from the real spirit and purpose of my invention, and it is my intention to cover by my claims such modified forms of structure or use of mechanical equivalents as may be reasonably included within their scope.

I claim as my invention:

1. In a shearing head construction, a head member, a shearing head comprising inner and outer elements and means for mounting said shearing head in said head member comprising a body member received in the head member and receiving the shearing head, said body member being rotatably mounted relative to said head member, said head member having a socket adapted to receive said shearing head within the outline of the head member in one position of rotation of said body member relative to said head member.

2. In a shearing head construction, a head member, a shearing head, means for mounting said shearing head in said head member comprising a body member movably mounted in said head member adjacent one side thereof, said shearing head being mounted in said body member with its shearing portion projecting from said side of said head member, said head member having a socket adapted to receive said shearing head within the outline of said head member when said body member is moved to one of its positions and means for locking said body member in either of said positions.

3. In a shearing head construction, a head member, inner and outer shearing elements and means for mounting said shearing elements in said head member comprising a body member received in said head member and receiving said shearing elements, said body member being rotatably mounted relative to said head member, said head member having a socket adapted to receive said shearing elements in one position of rotation of said body member relative to said head member, and means for reciprocating said inner cutter comprising a motion-transmitting member extending therefrom, through said body member, pivoted relative thereto and having an end projecting from the opposite side thereof and an operating lever having a notch receiving said projecting end when said body member is rotated to a position with said shearing head projecting from said head member.

4. In a shearing head construction, a head member, a shearing head and means for mounting said shearing head in said head member comprising a cylindrical body member seated in said head member and receiving said shearing head, said body member being movable relative to said head member and said head member having a socket adapted to receive said shearing head within the outline of the head member in one position of said body member relative to said head member.

5. In a shearing head construction, a head member, coacting shearing elements, means for mounting said shearing elements in said head member comprising a cylindrical body member rotatably mounted in said head member adjacent one side thereof, said shearing elements being mounted in said body member in position projecting from said side of said head member, said head member having a socket adapted to receive said shearing elements within the outline of said head member when said body member is rotated in one direction and means for locking said body member against rotation when it is in either a position with said shearing elements projecting for use or with them located within said socket.

6. In a shearing head construction, a head member, a shearing head comprising inner and outer elements and means for mounting said shearing head in said head member comprising a body member received in said head member and movably mounted relative thereto, said head member having a socket adapted to receive said shearing head within the outline of said head member in one position of said body member relative to said head member, and means for reciprocating said inner cutter comprising a motion-transmitting member extending therefrom, through said body member and projecting from the opposite side thereof and an operating lever having a notch receiving the projecting end thereof.

7. In a shearing head construction, a head member, a shearing head and means for rotatably mounting said shearing head in said head member, said shearing head being mounted in said body member with its shearing portion projecting therefrom, said head member having a socket adapted to receive said shearing head within the outline of said body member when said means is rotated in one direction and means for operating said shearing head.

8. In a shearing head construction, a head member having a socket, a shearing head rotatably mounted in said socket of said head member, said shearing head, in one position of rotation of said head member, projecting from said socket for use and, in another position of rotation of said head member assuming a protected position within said socket.

9. In a shearing head construction, a head member, a shearing head, means for mounting said shearing head in said head member comprising a cylindrical body member rotatably mounted in said head member adjacent one side thereof, said shearing head being mounted in said body member with its shearing portion projecting from said side of said head member, said head member having a socket adapted to receive said shearing head when said body member is rotated in one direction, means for locking said body member against rotation in either of said positions and means extending through said body member for operating said shearing head.

10. In a shearing head construction, a head member, a shearing head, means for mounting said shearing head in said head member comprising a cylindrical body member rotatably mounted in said head member adjacent one side thereof, said shearing head being mounted in said body member with its shearing portion projecting from said side of said head member, said head member having a socket adapted to receive said shearing head when said body member is rotated in one direction, said body member having a lateral opening therethrough and an actuating lever for said shearing head extending through said opening.

11. In a shearing head construction, a head member, a shearing head, means for mounting said shearing head in said head member comprising a cylindrical body member rotatably mounted in said head member adjacent one side thereof, said shearing head being mounted in said body member with its shearing portion projecting from said side of said head member, said head member having a socket adapted to receive said shearing head when said body member is rotated in one direction, an operating lever for said shearing head projecting into said head member and a motion-transmitting connection between said operating lever and said shearing head and extending laterally through said body member.

12. In a shearing head construction, a head member, shearing means, a body member rotatably mounted in said head member adjacent one side thereof, said shearing means being mounted therein with its shearing portion projecting from said side of said head member, said head member having a socket adapted to receive said shearing means within the outline of said head member when said body member is rotated in one direction, a lever extending laterally through said body member, means for pivoting said lever intermediate the ends thereof to said body member, one end of said lever coacting with said shearing means to operate it and the other end projecting from the body member and an operating member in said head member operatively connected with said projecting end when said body member is in position with said shearing means projecting for use.

13. In a shearing head construction, a head member, a shearing head movably mounted therein with its shearing portion projecting therefrom in one position of the shearing head relative to the head member, said head member having a socket adapted to receive said shearing head when it is moved to another position relative to said head member and an operating member in said head member operatively connected with said shearing head.

14. In a device of the class described, a head member having a socket therein, and shearing means carried by said head member and selectively movable to a position projecting out of said socket for use or to a position in said socket and thereby protected by said head member.

HARRY L. COLLINS.